United States Patent
Okman (10) Patent No.: US 12,190,159 B2
(45) Date of Patent: Jan. 7, 2025

(54) LIGHTWEIGHT REMOTE PROCESS EXECUTION

(71) Applicant: SAP Portals Israel Ltd., Ra'anana (IL)

(72) Inventor: Lior Okman, Tzoran-Kadima (IL)

(73) Assignee: SAP Portals Israel Ltd, Ra'anana (IL)

( * ) Notice: Subject to any disclaimer, the term of this patent is extended or adjusted under 35 U.S.C. 154(b) by 0 days.

(21) Appl. No.: 17/514,873

(22) Filed: Oct. 29, 2021

(65) Prior Publication Data
US 2022/0050723 A1  Feb. 17, 2022

Related U.S. Application Data

(63) Continuation of application No. 16/671,269, filed on Nov. 1, 2019, now Pat. No. 11,188,386.

(51) Int. Cl.
| | |
|---|---|
| G06F 9/50 | (2006.01) |
| G06F 9/54 | (2006.01) |
| G06F 21/53 | (2013.01) |
| H04L 67/00 | (2022.01) |
| H04L 67/01 | (2022.01) |
| H04L 67/10 | (2022.01) |

(52) U.S. Cl.
CPC .......... *G06F 9/5027* (2013.01); *G06F 9/5072* (2013.01); *G06F 9/545* (2013.01); *G06F 21/53* (2013.01); *H04L 67/01* (2022.05); *H04L 67/10* (2013.01); *H04L 67/34* (2013.01)

(58) Field of Classification Search
CPC ........ G06F 21/53; G06F 9/5072; G06F 9/545; G06F 9/5027; H04L 67/42; H04L 67/10; H04L 67/34
See application file for complete search history.

(56) References Cited

U.S. PATENT DOCUMENTS

| | | | |
|---|---|---|---|
| 9,690,558 B2 | 6/2017 | Bendelac et al. | |
| 2003/0182347 A1* | 9/2003 | Dehlinger | G06F 9/45554 718/1 |

(Continued)

OTHER PUBLICATIONS

GitHub "Eclipse: Che-Machine-Exec" Aug. 30, 2019, [Retrieved on Oct. 31, 2019], retrieved from: URL <https://github.com/eclipse/che-machine-exec>, 6 pages.

(Continued)

Primary Examiner — Tuan C Dao
(74) Attorney, Agent, or Firm — Fish & Richardson P.C.

(57) ABSTRACT

The present disclosure involves systems, software, and computer implemented methods for remotely executing binaries in a containerized computing environment using a lightweight inter-process communications protocol (IPC) and UNIX domain sockets. One example method includes establishing, in a shared computing image comprising a plurality of containers, a listening UNIX domain socket, where the listening UNIX domain socket is shared between all containers in the shared computing image. A request to execute a binary in the target container is received at a target container and from a client container using the listening UNIX domain socket. A worker service is generated in the target container. The worker service executes the binary in the target container. A return exit code associated with the executed binary is received and sent to the client container using the UNIX domain socket.

20 Claims, 5 Drawing Sheets

(56) References Cited

U.S. PATENT DOCUMENTS

| | | | | |
|---|---|---|---|---|
| 2003/0191941 | A1 | 10/2003 | Terada et al. | |
| 2005/0251785 | A1* | 11/2005 | Vertes | G06F 11/2097 714/E11.073 |
| 2006/0136235 | A1 | 6/2006 | Keohane et al. | |
| 2009/0083756 | A1 | 3/2009 | Kim et al. | |
| 2011/0161988 | A1 | 6/2011 | Kashyap et al. | |
| 2011/0302569 | A1* | 12/2011 | Kunze | G06F 8/63 709/224 |
| 2013/0179991 | A1 | 7/2013 | White et al. | |
| 2013/0227641 | A1* | 8/2013 | White | H04W 12/12 726/1 |
| 2014/0053150 | A1 | 2/2014 | Barnett et al. | |
| 2014/0122435 | A1 | 5/2014 | Chavda et al. | |
| 2015/0006487 | A1 | 1/2015 | Yang et al. | |
| 2015/0156250 | A1* | 6/2015 | Varshney | H04L 67/10 709/201 |
| 2016/0342786 | A1* | 11/2016 | Gerebe | G06F 21/52 |
| 2016/0378518 | A1* | 12/2016 | Antony | G06F 9/5077 718/1 |
| 2017/0262266 | A1 | 9/2017 | Bendelac et al. | |
| 2017/0366492 | A1 | 12/2017 | Ho et al. | |
| 2018/0007178 | A1* | 1/2018 | Subhraveti | G06F 9/541 |
| 2018/0157521 | A1* | 6/2018 | Arikatla | G06F 9/45558 |
| 2018/0157677 | A1 | 6/2018 | Bafna et al. | |
| 2019/0065096 | A1* | 2/2019 | Sterin | G06F 9/45558 |
| 2019/0102206 | A1* | 4/2019 | Fichtenholtz | G06F 9/44505 |
| 2019/0391844 | A1* | 12/2019 | Chen | G06F 9/45558 |
| 2020/0169481 | A1 | 5/2020 | Okman et al. | |
| 2020/0356376 | A1* | 11/2020 | Lynch | G06F 9/45558 |
| 2021/0133000 | A1 | 5/2021 | Okman | |

OTHER PUBLICATIONS

Wikipedia Contributers, "Berkeley R-Command", available on or before May 3, 2019, via Internet Archive: Wayback Machine URL<https://web.archive.org/web/20190503011945/https://en.wikipedia.org/wiki/Berkeley_r-commands>, [retrieved on Oct. 31, 2019], retrieved from: URL <https://en.wikipedia.org/wiki/Berkeley_r-commands>, 3 pages.

* cited by examiner

LIGHTWEIGHT REMOTE PROCESS EXECUTION

CLAIM OF PRIORITY

This application claims priority under 35 USC § 120 to U.S. patent application Ser. No. 16/671,269, filed on Nov. 1, 2019 titled "LIGHTWEIGHT REMOTE PROCESS EXECUTION" now issued as U.S. Pat. No. 11,188,386 issued on Nov. 30, 2021; the entire contents of which are hereby incorporated by reference.

TECHNICAL FIELD

This disclosure generally relates to cross-container binary execution in an open-source container-orchestration system.

BACKGROUND

An application in an open-source container-orchestration system for automated application deployment, scaling, and management (such as, KUBERNETES or DOCKER) is run in a set of containers. For example, KUBERNETES controls resources available to each of the containers and enforces limits around an amount of CPU and memory made available to processes executing in the containers. Each container in a KUBERNETES application has its own distinct filesystem image, which is based on an Open Container Initiative (OCI) image specified in the KUBERNETES application descriptor. KUBERNETES allows containers which are run in the same application to share a set of folders—like a network share. A well-established pattern in the KUBERNETES world is to separate applications into multiple containers, where different constraints are applied to each container in a particular solution. Due to different file systems available in each container, if a binary or utility installation is required in more than one container, it needs to be separately installed in each of these containers. Depending on the specific software, the requirement to install the same type of software in all containers can be hard to satisfy. In other use cases, it is not possible to anticipate in advance during the build phase of a specific OCI image what the full set of required binaries will be during runtime.

SUMMARY

The present disclosure describes techniques for cross-container binary execution in an open-source container-orchestration system.

In a particular implementation, a computer-implemented method comprises establishing in a shared computing image that includes a plurality of containers, a listening UNIX domain socket. Then receiving, from a client container and at a target container, a request to execute a binary at the target container, using the UNIX domain socket. The target container then generates a worker service, which executes the requested binary. Upon completion of the execution, the binary returns an exit code to the target container, which passes it to the client container using the UNIX domain socket.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, in the described solution, in the event a binary or utility is used by more than one container, each container in the shared computing environment need not separately install the binary or utility in its own individual file system. Instead the binary or utility can be installed one time in one container (using a shared file system) and then other containers can remotely execute the binary or utility. Second, in using UNIX inter-process communication (IPC) in a shared computing environment, shared computing environments commonly enforce resource restrictions on each individual container. However, by using point-to-point UNIX IPC it is assured that the resource restrictions that apply to the binary being executed are the resource restrictions of the container executing the binary, not the container requesting the execution. This ensures that resources are isolated between binaries, which allows for simpler allocation of computing resources while providing containers with capabilities beyond their current resource allocation. Third, because IPC using UNIX domain sockets is leveraged, it is assured that only containers which share the same context (that is, a shared computing image) are able to communicate. Therefore encryption, authorization, and authentication of data communication is not required. Thus IPC can be faster, and require less bandwidth because it can occur using non-secured means. Fourth, a request to remotely execute a binary can include open file descriptors, which allows the remotely executing binary to pass outputs and receive inputs in a manner that appears as if the binary is running in the client container. In other words, the fact that the binary is executing in a different container is transparent to the client container making the execute request.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

This disclosure describes a method for using inter-process communication (IPC) using UNIX domain sockets to remotely execute binaries in a containerized, shared computing environment, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

An application in an open-source container-orchestration system for automated application deployment, scaling, and management (such as, KUBERNETES or DOCKER) is run in a set of containers. Note that while one or more systems such as KUBERNETES or DOCKER are used within the disclosure for purposes of description and understanding, the use of KUBERNETES, DOCKER, or any other particular open-source container-orchestration system is not required and is not meant to limit the disclosure in any way.

In an example, KUBERNETES controls resources available to each of the containers and enforces limits around an amount of CPU and memory made available to processes executing in the containers. Each container in a KUBERNETES application has its own distinct file-system image, which is based on an Open Container Initiative (OCI) image specified in the KUBERNETES application descriptor. KUBERNETES allows containers which are run in the same application to share a set of folders—like a network share. A well-established pattern in the KUBERNETES world is to separate applications into multiple containers, where different constraints are applied to each container in a particular solution. Due to different file systems available in each container, if a binary or utility installation is required in more than one container, it needs to be separately installed in each of these containers. Depending on the specific software, the requirement to install the same type of software in all containers can be hard to satisfy. In other use cases, it is not possible to anticipate in advance during the build phase of a specific OCI image what the full set of required binaries will be during runtime.

A KUBERNETES based development environment can contain an integrated development environment (IDE) in one container (a main container), and an additional set of tools installed side-by-side (or sidecar) in other containers with respect to the IDE container. A particular set of sidecar containers required for a specific session is not known when a main container which runs the IDE is built. The binaries which comprise the additional tools are available in each of the sidecar containers (for example, GOLANG and JAVA, respectively), but not in the main container where the developer would execute build operations.

In some cases, it might be possible to copy all the required binaries into the main container, for example during the KUBERNETES application startup. This approach would work for simple installations, but not for all cases. If a tool has a complex set of runtime dependencies, copying them correctly to the main container would be time-consuming and hard to do correctly in a general case. For example, if the main container contains shared objects which conflict with shared objects from a sidecar container, the copy operation would fail to yield a working installation. The disclosure describes a method for lightweight remove execution to make it appear as if binaries from any container in the deployment are available to be executed in any other container in an open-source container-orchestration system.

At a high-level, a lightweight remote execution mechanism is split into two main components, a client and a server. The server establishes a listening UNIX Domain socket in a file system, which is shared between all containers in a shared context (for example, a KUBERNETES Pod). When a client connects to the socket, the client transmits to the server a minimal set of information required to allow the server to spawn a required binary: a command path, a set of arguments, a working directory, and a set of environment variables which are known on the client-side. In addition, the client side can pass open file descriptors to the server-side allowing a remotely executing binary to use file-descriptor based IPC. The server side spawns the command based on this information, but in the context of the remote (relative to the client binary) container. The client binary also installs standard signal handlers to intercept signals which are local to the client environment, and if a signal occurs at any time then the client transmits this signal to the server which propagates the signal to the actual binary.

When the executed command exists, the server can reap the process and transmits the returned value to the client-side. The client-side exits with the same return value and completes the illusion that the real command was executed locally. In some instances each container in the shared computing environment shares a same network namespace. Sharing the same network namespace is the default for KUBERNETES managed pods and is achieved on DOCKER by adding the relevant parameter when running the container—of interest when the remote process is expected to open a network port on the localhost address, but not a hard-requirement for the described method.

Because the IPC used is UNIX Domain Sockets, only processes with access to the shared file system can connect to the server. The shared file system is guaranteed by the container management service to be private to the containers which share the same context. Therefore encryption, authorization, and authentication of the data which flows through this socket are not required.

Because file descriptors are passed between server and client, there are no additional copy operations for the data passed through the standard input, output, and error streams. This fact means that the command execution framework doesn't add any additional latency or performance overhead to the command execution, and that pipe/pseudo-terminal semantics are always adhered to correctly.

Since all communication is performed using standard UNIX IPC, required use conditions are that both sides must be run by the same kernel and that they share a file system. These two requirements are standard requirements for most container management engines, meaning the code is agnostic to a specific container management engine being used.

In the same shared context provided by an underlying container management engine, all containers in the same context can simultaneously play a role of both client and server, and the communication is always point-to-point. This means that any number of containers can be added to execute remote commands. Resource restrictions applied to an actual command would be a set of restrictions defined around a container executing a real binary. This allows for true resource isolation between binaries, while maintaining the illusion from a main terminal that all of the processes are executed in the same environment.

Figure 1:
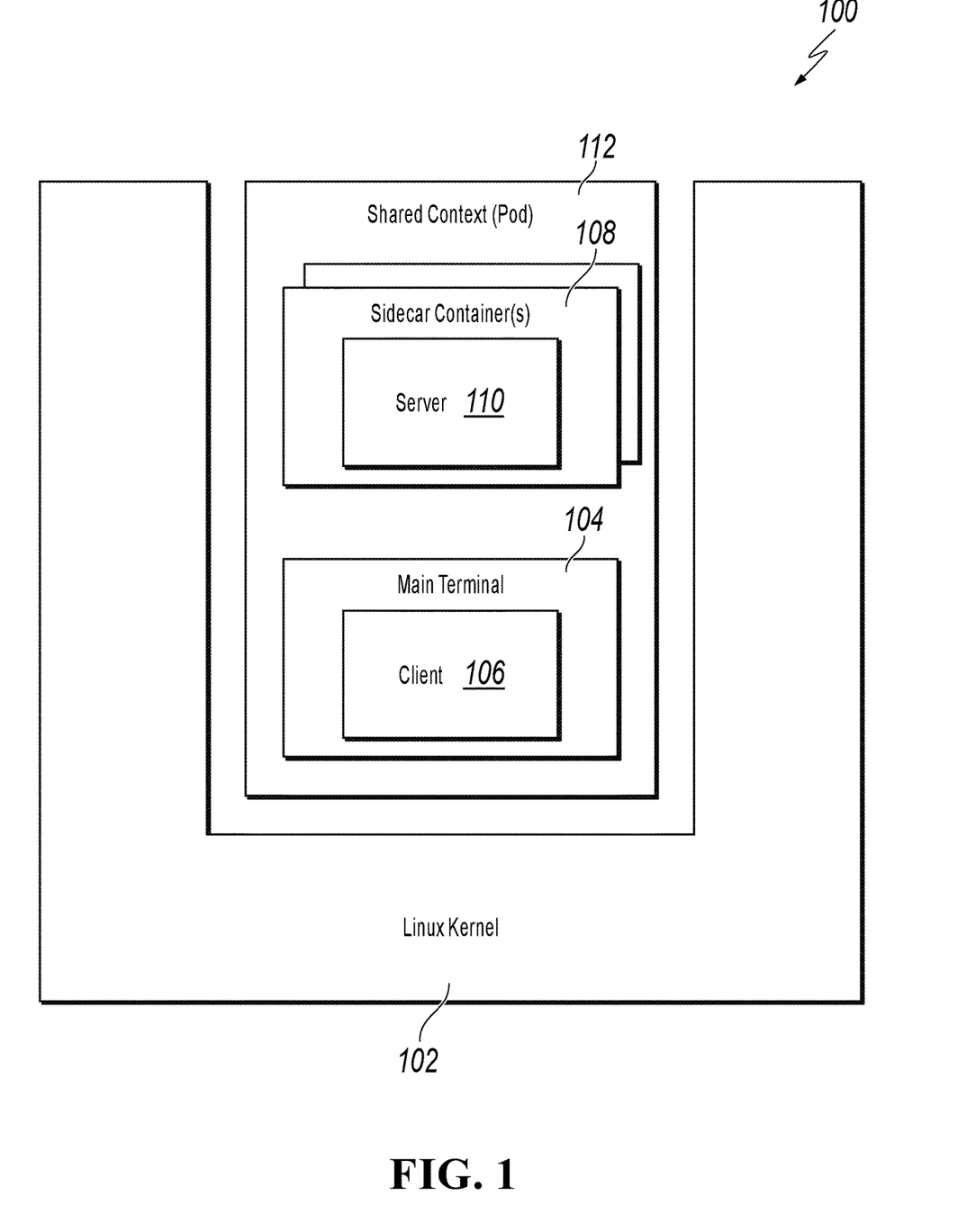
FIG. 1 depicts a high-level architecture of a shared computing image, according to an implementation of the present disclosure.

FIG. 1 depicts a high-level architecture of a shared computing image, according to an implementation of the present disclosure. A shared computing context 112 can include a plurality of containers 104, 108, each running its own operating system and file system, and in some cases all sharing a common shared file system. The shared computing image can ensure that each container is operating based on the same LINUX kernel 102, and can set a resource limit for each container. In some implementations the shared computing image is known as a pod. Multiple pods can be run on a single machine or server, or can be spread across a plurality of machines, servers, or virtual machines with each pod running entirely on a single system. The present disclosure is not limiting thereto.

The shared context 112 can include a main terminal 104 which is a container running a client application 106. The user can interact with the shared context 112 using the client 106. The client application 106 on the main terminal can require a diverse set of separate applications and functions to be run. These applications and functions can be run in the sidecar containers 108, which can operate one or more server applications 110. Because the entire shared context 112 is guaranteed to be operating on the same LINUX kernel 102, and within the same machine (for example, a server or a virtual machine) it is possible to use UNIX domain sockets for IPC. By remotely executing binaries in this manner, each container need not store libraries and files for operating each binary it requires. Instead containers can operate the binaries remotely, preventing the need for duplicate libraries and files across multiple containers.

Figure 2:
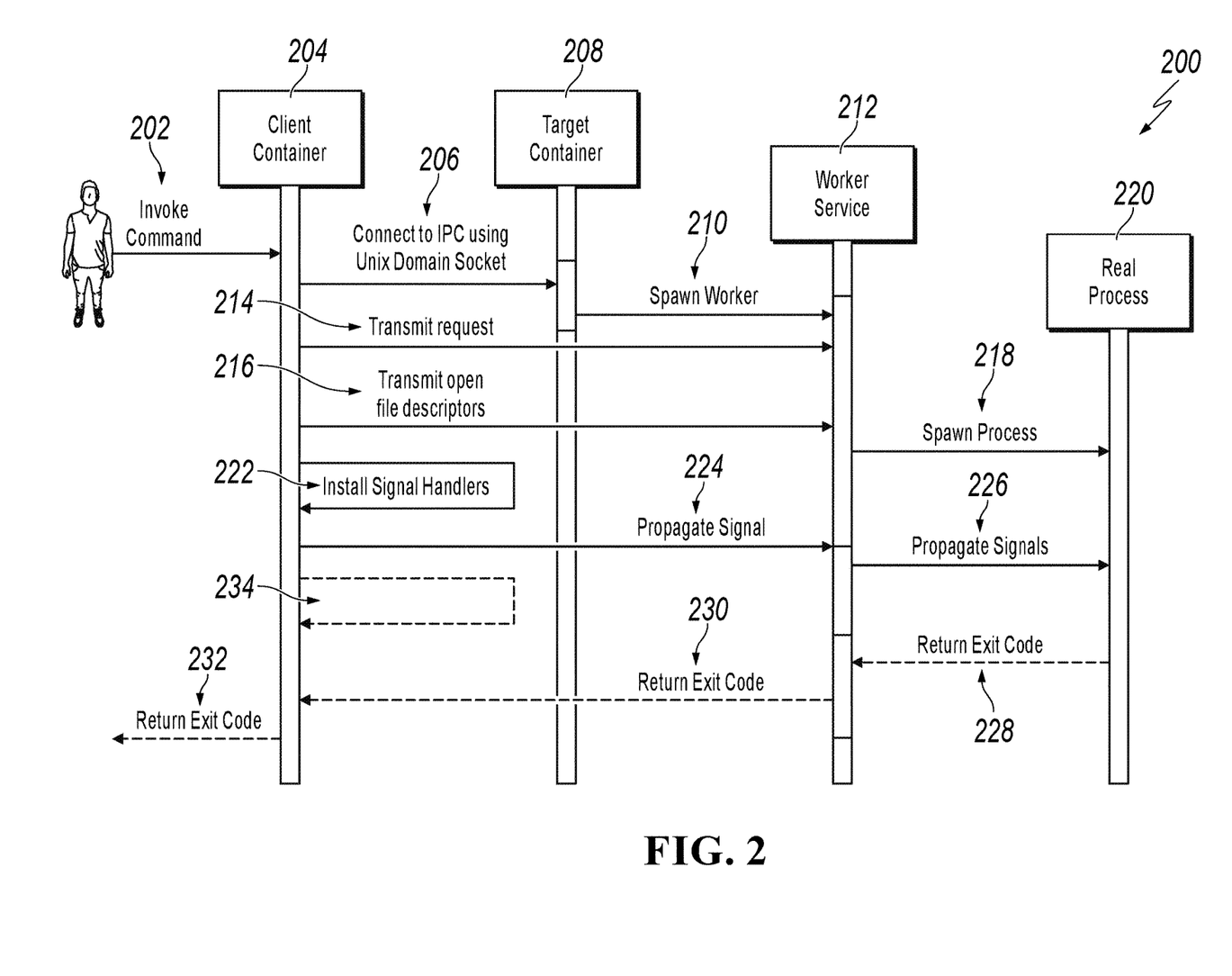
FIG. 2 illustrates an example swim diagram depicting cross-container communication in a shared computing image, according to an implementation of the present disclosure.

FIG. 2 illustrates an example swim diagram 200 depicting cross-container communication in a shared computing image, according to an implementation of the present disclosure. For clarity of presentation, the description that follows generally describes the cross-communication in the context of the other figures in this description. However, it will be understood that the cross-communication can be performed, for example, by any system, environment, software, and hardware, or a combination of systems, environments, software, and hardware, as appropriate. In some implementations, various steps of the cross-communication can be run in parallel, in combination, in loops, or in any order.

At 202, a command is invoked in a client environment (for example, by a user or program). A client container 204 connects to the server IPC at 206, which spawns 210 a dedicated worker service 212 in the target environment (for example, a container) for this specific invocation. The client container 204 then transmits the request 214, including some or all required information like current working directory, binary path, arguments, and environment variables to the worker service 212, as well as passing some or all open file descriptors at 216. The worker service 212 can then spawn 218 the real process 220 (for example, a binary) with this information after attaching the correct file descriptors to the new process. In some instances the client container 204 also installs local event (such as, signal) handlers at 222, and propagates 224 any asynchronous signals received in the client container 204 to the worker service 212. The worker service 212 in turn propagates 226 these signals (if they occur) to the real process 220. The worker service 212 waits for the real process 220 to terminate, receives an exit code 228, and returns the exit code 230 to the client container 204 using the established IPC. The client container 204 returns the exit code to the client environment and then terminates. In some implementations, other event handlers 234 can be, for example, standard-type callback routines that are activated upon an event (such as, mouse clicks, keyboard inputs, timer expiration, or other computer based triggers) occurring.

While FIG. 1 depicts a client in the main terminal and a server in a sidecar container, and FIG. 2 depicts a single client and server, it will be understood that each container in the shared computing environment can act as both a client and a server simultaneously. In some instances a container can act as both a client for one process and a server for another simultaneously. In this way, remote execution can occur between any two containers in the shared computing environment, and a plurality of remotely executing binaries can exist between containers at any given time.

Figure 3:
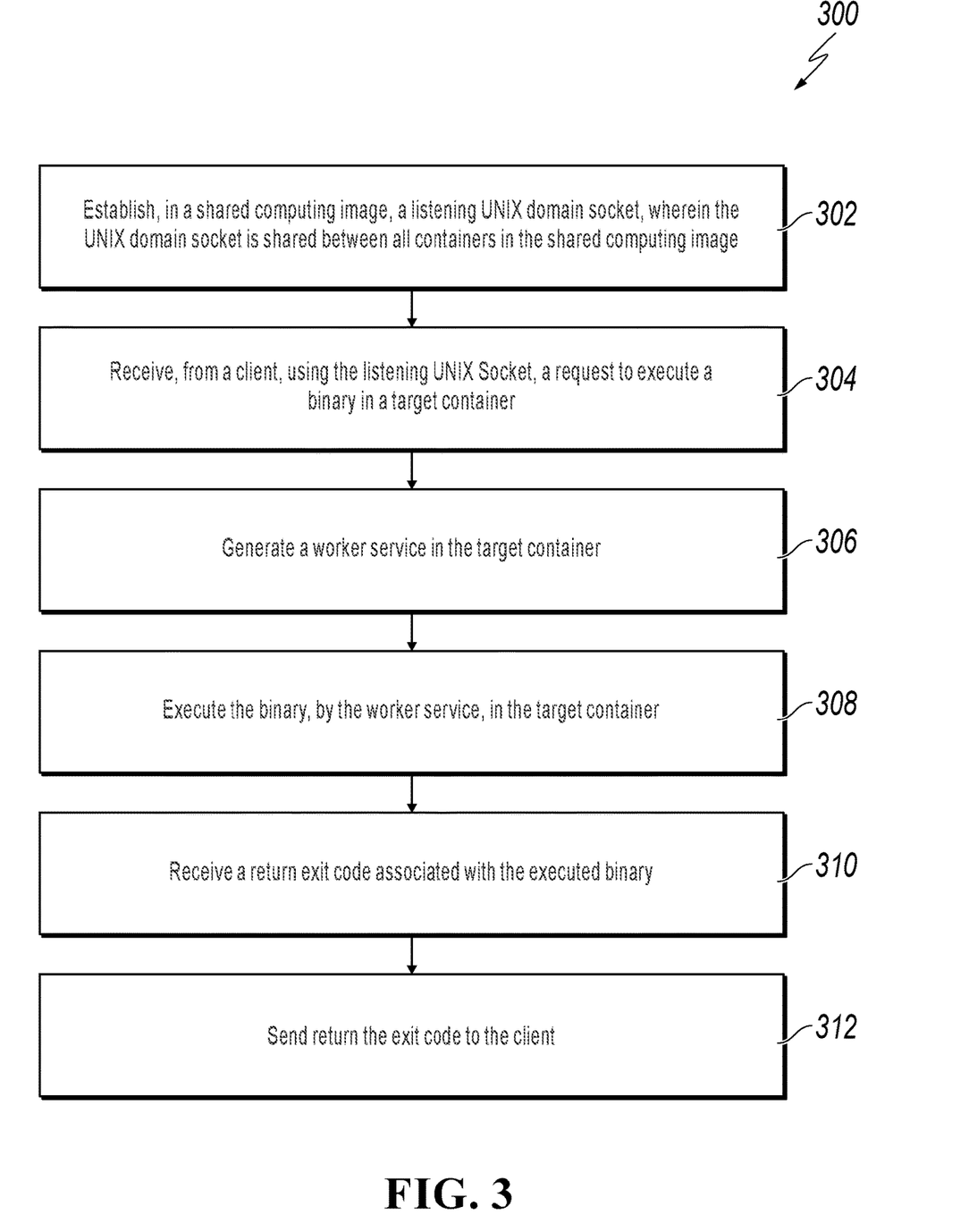
FIG. 3 is a flowchart describing an example method for cross-container communications in a shared computing image, according to an implementation of the present disclosure.

FIG. 3 is a flowchart describing an example method 300 for cross-container communications in a shared computing image, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a listening UNIX domain socket is established in a shared computing image. The shared computing image can contain a plurality of containers with a shared file-system. Each container has its own distinct file-system image, and the shared computing image enforces memory and processing limits on each container. A UNIX domain socket can be opened between the containers allowing IPC.

At 304, a request to execute a binary in a target container is received from a client. The client can be a client container, which communicates to the target container using the listening UNIX domain socket. The request can contain a command path, a set of arguments, a working directory, and a set of environment variables which are known on the client-side. In some instances, the client side can pass open file descriptors to the server-side allowing a remotely executing binary to use file-descriptor based IPC.

At 306, the target container generates a worker service. The worker service can be an executable running on the target container and utilizing some of the target container's allocated memory and processing limits. In some instances the worker service has received open file descriptors, and can read and write to files associated with the file descriptors.

At 308, the worker service executes the requested binary in the target container. The worker service using the command path, set of arguments, working directory, and environment variables can execute the binary, modifying any files necessary using the open file-descriptors provided.

At 310, when the binary has been fully executed, the worker service can receive a return code associated with the executed binary. The return code can simply signify the binary is completed, or it can contain data associated with the execution. In some instances the return code can signify the type of exit from the executing binary, for example, an error code, a "command not found" code, or a "process successful" code.

At 312, the target container passes the return code to the client container using the UNIX domain socket. In some instances this process is transparent to the client container. From the perspective of the client container it appears as though the binary executed locally using the UNIX domain socket. After 312, method 300 can stop.

Figure 4:
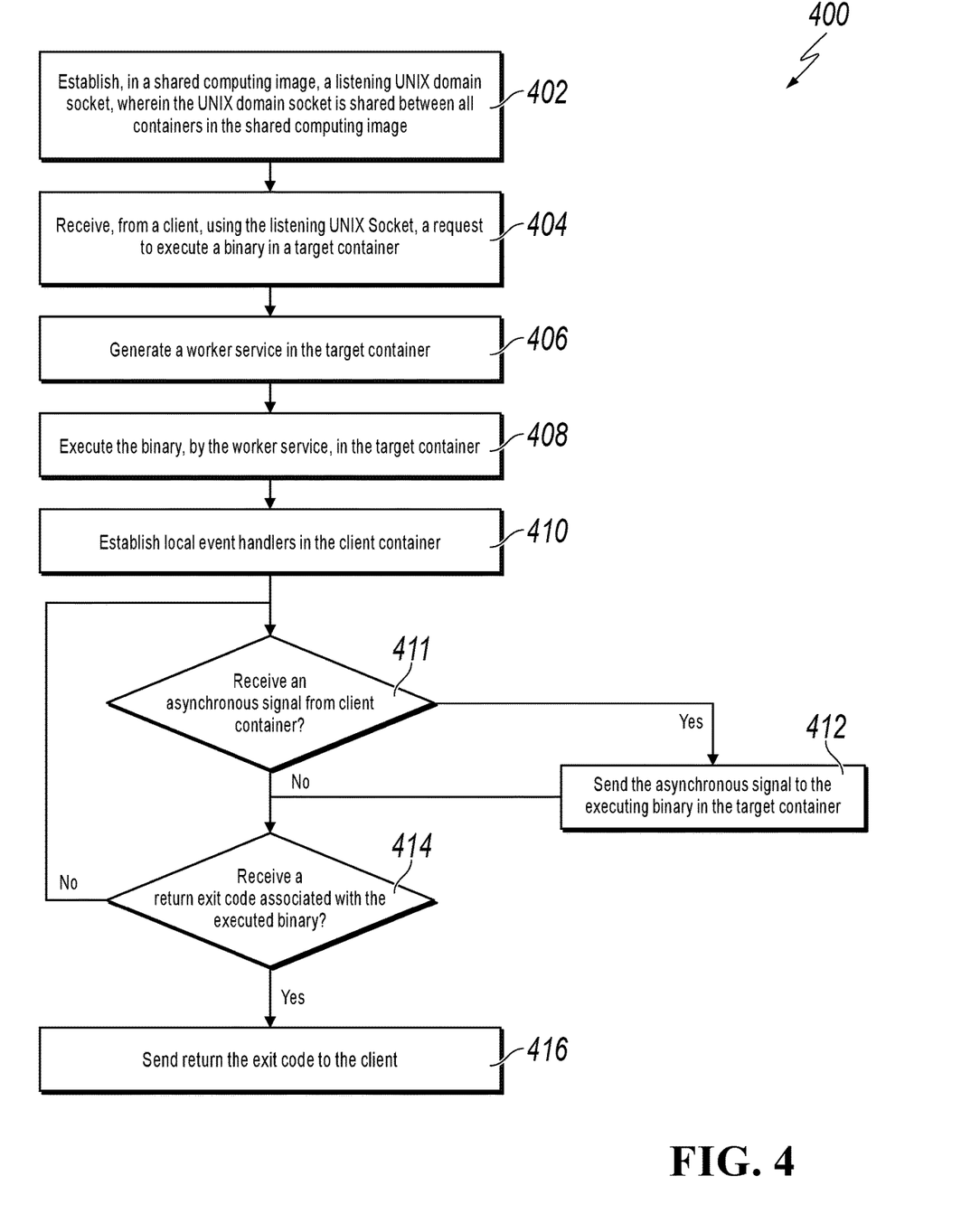
FIG. 4 is a flowchart describing an additional example method for cross-container communications in a shared computing image, according to an implementation of the present disclosure.

FIG. 4 is a flowchart describing an additional example method 400 for cross-container communications in a shared computing image, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a listening UNIX domain socket is established in a shared computing image. The shared computing image can contain a plurality of containers with a shared file-system. Each container has its own distinct file-system image, and the shared computing image enforces memory and processing limits on each container. A UNIX domain socket can be opened between the containers allowing IPC.

At 404, a request to execute a binary in a target container is received from a client. The client can be a client container, which communicates to the target container using the listening UNIX domain socket. The request can contain a command path, a set of arguments, a working directory, and a set of environment variables which are known on the client-side. In some instances, the client side can pass open file descriptors to the server-side allowing a remotely executing binary to use file-descriptor based IPC.

At 406, the target container generates a worker service. The worker service can be an executable running on the target container and utilizing some of the target container's allocated memory and processing limits. In some instances the worker service has received open file descriptors, and can read and write to files associated with the file descriptors.

At 408, the worker service executes the requested binary in the target container. The worker service using the command path, set of arguments, working directory, and environment variables can execute the binary, modifying any files necessary using the open file-descriptors provided.

At 410, local event handlers are established at the client container. Local event handlers can be standard callback routines that are activated upon an event occurring. Events can be, for example, mouse clicks, keyboard inputs, timer expiration or other computer based triggers. The event handlers can be configured to pass commands, or changes in environment variables from the client container, to the target container, such that an asynchronous signal received at the client container can be used as an input at the remotely running binary in the target container.

At 411, while the binary is executing in the target container, it is determined whether an asynchronous signal is received from the client container. If an asynchronous signal is received, at 412 the signal is sent to the executing binary in the target container. Otherwise method 400 proceeds to 414.

At 414 it is determined whether an exit code has been returned. If no exit code has been returned method 400 returns to 411, otherwise method 400 proceeds to 416.

At 416, the target container passes the return code to the client container using the UNIX domain socket. In some instances this process is transparent to the client container. From the perspective of the client container it appears as though the binary executed locally using the UNIX domain socket. After 416, method 400 can stop.

Figure 5:
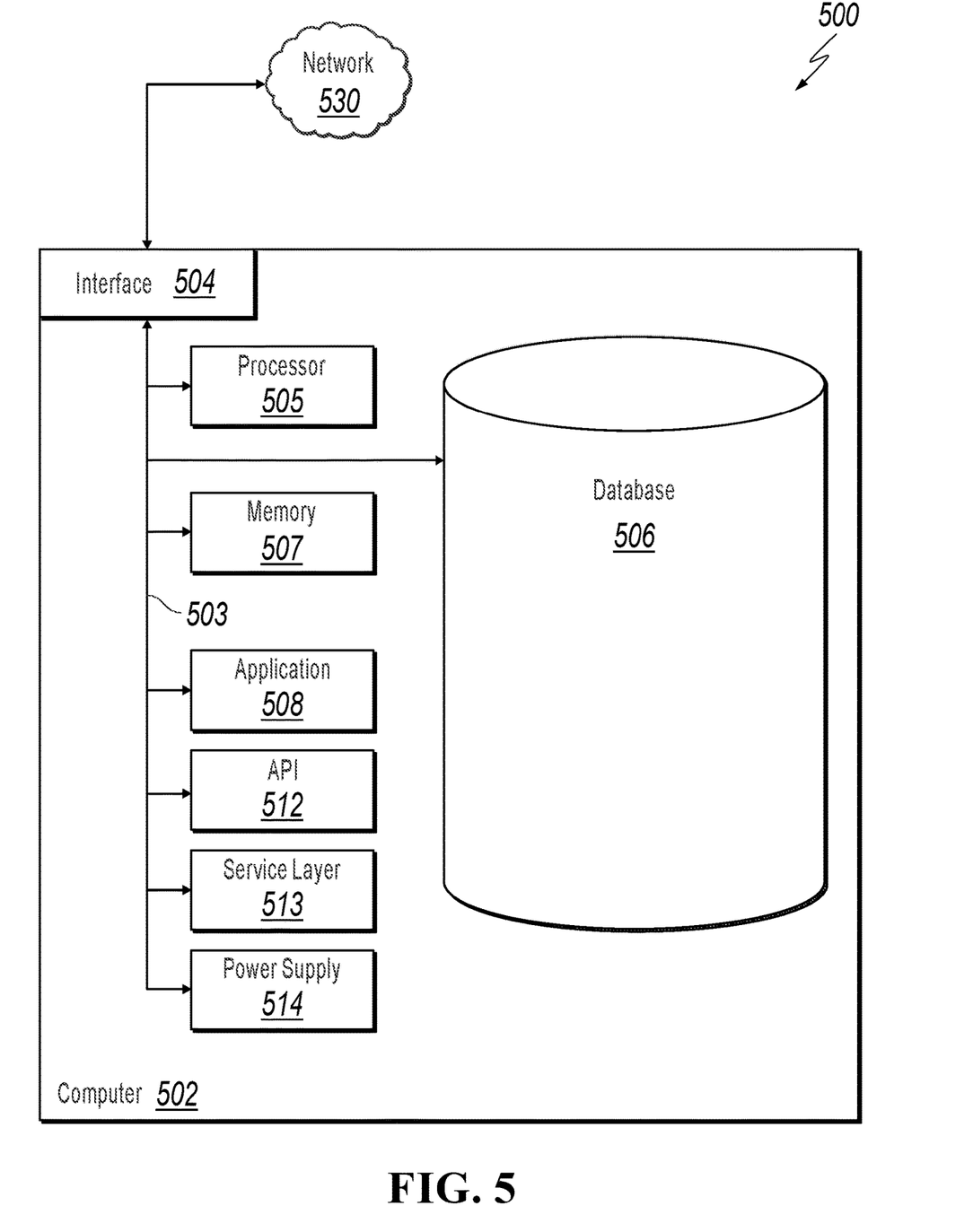
FIG. 5 is a block diagram illustrating an example of a computer-implemented System used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. The Database 506 can hold any data type necessary for the described solution.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a method for cross-container execution of binaries includes. Establishing, in a shared computing image comprising a plurality of containers, a listening UNIX domain socket, wherein the listening UNIX domain socket is shared between all containers in the shared computing image. Receiving, at a target container and from a client container, using the listening UNIX domain socket, a request to execute a binary in the target container. Generating a worker service in the target container. Executing, by the worker service, the binary in the target container. Receiving a return exit code associated with the executed binary. Sending the return exit code, using the UNIX domain socket, to the client container.

The foregoing and other described implementations can each, optionally, include one or more of the following features:

A first feature, combinable with any of the following features, the request to execute a binary in a target container includes a command path, a set of arguments, a working directory, and a set of environment variables, wherein the environment variables are associated with the client.

A second feature, combinable with any of the previous or following features, the request to execute a binary in a target container includes open file descriptors associated with files in the shared computing image.

A third feature, combinable with any of the previous or following features includes, establishing local signal handlers at the client container, and in response to receiving an asynchronous signal during the execution of the binary propagating, by the local signal handler and using the UNIX domain socket, the asynchronous signal to the executing binary.

A fourth feature, combinable with any of the previous or following features, each container is allocated computing resources, and wherein the execution of the binary in the target container utilizes resources of the target container.

A fifth feature, combinable with any of the previous or following features, the shared computing image ensures all containers in the shared computing image are generated from the same kernel and share a file system.

A sixth feature, combinable with any of the previous or following features, wherein the binary is one of a plurality of binaries to be remotely executed, and wherein one or more containers in the plurality of container acts as both a client container and a target container in the remote execution of the plurality of binaries to be remotely executed, using a plurality of UNIX domain listening sockets.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for cross-container execution of binaries in a Kubernetes environment comprising:
    establishing, in the Kubernetes environment, a listening UNIX domain socket that is shared between all containers in the Kubernetes environment;
    receiving, at a target container and from a client container, using the listening UNIX domain socket, a request to execute a binary in the target container;
    executing the binary in the target container based on the request;
    receiving a return exit code associated with the executed binary; and
    sending the return exit code, using the listening UNIX domain socket, to the client container.

2. The computer-implemented method of claim 1, wherein the request to execute the binary in the target container comprises:
    a command path;
    a set of arguments;
    a working directory; and
    a set of environment variables, wherein the set of environment variables are associated with the client container.

3. The computer-implemented method of claim 1, wherein the request to execute the binary in the target container comprises open file descriptors associated with files in the Kubernetes environment.

4. The computer-implemented method of claim 1, further comprising:
    establishing local signal handlers at the client container; and
    in response to receiving an asynchronous signal during the execution of the binary:
        propagating, by the local signal handler and using the listening UNIX domain socket, the asynchronous signal to the executing binary.

5. The computer-implemented method of claim 1, wherein each container is allocated computing resources, and wherein the execution of the binary in the target container utilizes resources of the target container.

6. The computer-implemented method of claim 1, wherein the Kubernetes environment ensures all containers in the Kubernetes environment are generated from a same kernel and share a file system.

7. The computer-implemented method of claim 1, wherein the binary is one of a plurality of binaries for remote execution, and wherein one or more containers in the Kubernetes environment act as both a particular client container and a particular target container in the remote execution of the plurality of binaries, using a plurality of UNIX domain listening sockets.

8. A non-transitory, computer-readable medium storing one or more instructions executable by a computer system to perform operations comprising:
    establishing, in the Kubernetes environment, a listening UNIX domain socket that is shared between all containers in the Kubernetes environment;
    receiving, at a target container and from a client container, using the listening UNIX domain socket, a request to execute a binary in the target container;
    executing the binary in the target container based on the request;
    receiving a return exit code associated with the executed binary; and
    sending the return exit code, using the listening UNIX domain socket, to the client container.

9. The non-transitory, computer-readable medium of claim 8, wherein the request to execute the binary in the target container comprises:
    a command path;
    a set of arguments;
    a working directory; and
    a set of environment variables, wherein the set of environment variables are associated with the client container.

10. The non-transitory, computer-readable medium of claim 8, wherein the request to execute the binary in the target container comprises open file descriptors associated with files in the Kubernetes environment.

11. The non-transitory, computer-readable medium of claim 8, the operations further comprising:
    establishing local signal handlers at the client container; and
    in response to receiving an asynchronous signal during the execution of the binary:

propagating, by the local signal handler and using the listening UNIX domain socket, the asynchronous signal to the executing binary.

12. The non-transitory, computer-readable medium of claim 8, wherein each container is allocated computing resources, and wherein the execution of the binary in the target container utilizes resources of the target container.

13. The non-transitory, computer-readable medium of claim 8, wherein the Kubernetes environment ensures all containers in the Kubernetes environment are generated from a same kernel and share a file system.

14. The non-transitory, computer-readable medium of claim 8, wherein the binary is one of a plurality of binaries for remote execution, and wherein one or more containers in Kubernetes environment act as both a particular client container and a particular target container in the remote execution of the plurality of binaries, using a plurality of UNIX domain listening sockets.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
establishing, in the Kubernetes environment, a listening UNIX domain socket that is shared between all containers in the Kubernetes environment;
receiving, at a target container and from a client container, using the listening UNIX domain socket, a request to execute a binary in the target container;
executing the binary in the target container based on the request;

receiving a return exit code associated with the executed binary; and
sending the return exit code, using the listening UNIX domain socket, to the client container.

16. The computer-implemented system of claim 15, wherein the request to execute the binary in the target container comprises:
a command path;
a set of arguments;
a working directory; and
a set of environment variables, wherein the set of environment variables are associated with the client container.

17. The computer-implemented system of claim 15, wherein the request to execute the binary in the target container comprises open file descriptors associated with files in the Kubernetes environment.

18. The computer-implemented system of claim 15, the one or more operations further comprising:
establishing local signal handlers at the client container; and
in response to receiving an asynchronous signal during the execution of the binary:
propagating, by the local signal handler and using the listening UNIX domain socket, the asynchronous signal to the executing binary.

19. The computer-implemented system of claim 15, wherein each container is allocated computing resources, and wherein the execution of the binary in the target container utilizes resources of the target container.

20. The computer-implemented system of claim 15, wherein the Kubernetes environment ensures all containers in the Kubernetes environment are generated from a same kernel and share a file system.

\* \* \* \* \*